(Model.)
F. P. SHELDON.
MACHINE FOR FEEDING COLLETS TO BUTTON MAKING MACHINERY.
No. 245,409. Patented Aug. 9, 1881.
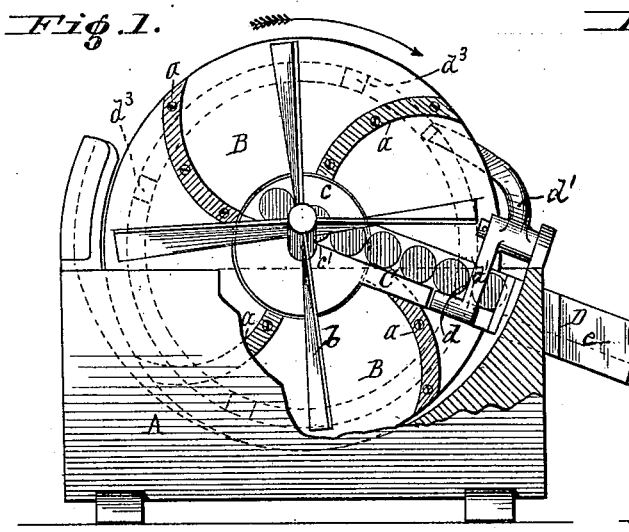
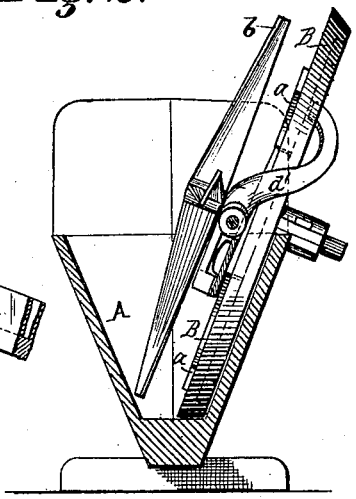
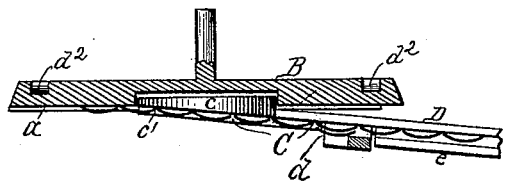
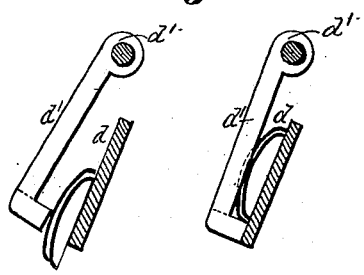
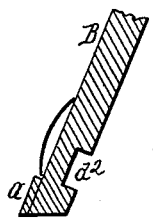
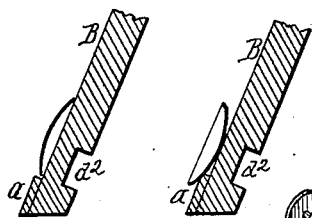
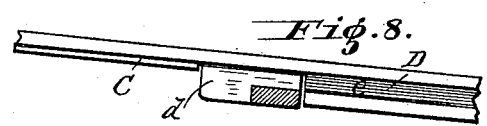
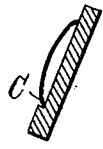
Attest:
H. C. Perrine
Philip F. Larner
Inventor:
Frank P. Sheldon.
By Wm. C. Wood Atty.

UNITED STATES PATENT OFFICE.

FRANK P. SHELDON, OF PROVIDENCE, ASSIGNOR TO HENRY B. METCALF, OF PAWTUCKET, R. I., AND WILLIAM McCLEERY, OF BOSTON, MASS.

MACHINE FOR FEEDING COLLETS TO BUTTON-MAKING MACHINERY.

SPECIFICATION forming part of Letters Patent No. 245,409, dated August 9, 1881.

Application filed November 17, 1880. (Model.)

*To all whom it may concern:*

Be it known that I, FRANK P. SHELDON, of the city and county of Providence, in the State of Rhode Island, have invented certain new and useful Improvements in Machines for Feeding Collets to Button-Making Machinery; and I do hereby declare that the following specification, taken in connection with the drawings furnished and forming a part of the same, is a clear, true, and complete description of my invention.

My improvements relate to machinery for making that class of buttons which involve the use of stamped metal shells and collets, joined together by compression, and they have been specially devised for automatically feeding collets to the dies of button-making machinery, although applicable also to the feeding of front shells, especially when the latter have the saucer-like contour common to collets.

While I am aware that there are numerous pre-existing organizations of mechanism for automatically feeding blanks of various kinds to the dies of button-machines, and to others more or less analogous thereto, I know of none prior to my present invention which has been specially adapted to operate with collets in delivering them to dies with that degree of precision and accuracy which is essential for the practical operation of button-making machinery, especially such as is relied upon for the manufacture of cloth-covered buttons. The collets being usually saucer-shaped are especially liable to "nest" together one within the other, and the presence of more than one collet in a die not only results in the waste of both collets, but also usually results in the waste of all the other component parts of the button, the collet being the member in the series of parts last applied in building up the button. The presence of more than one collet in a die is also liable to injure such dies as are employed in making cloth-covered buttons. The collets also vary largely in their sectional contour, some of them being but slightly concavo-convex, and this adds largely to the difficulty of so separating them from a mass as to enable them to be assembled for delivery, facing always in one direction, in order that when deposited in the die they shall present their rims upward, as is usual in machinery for making cloth-covered buttons, or downward, as might be desirable in other classes of machines.

The several devices and combinations of devices believed to be novel will be specified in the claims hereunto annexed, and while I prefer to employ all that I have shown in one organization, I am well aware that some of them may be profitably employed separately, or in connection with mechanism other than that herein disclosed.

To particularly describe my invention, I will refer to the accompanying drawings, in which—

Figure 1 is a side view of a hopper or receptacle for the collets in mass, the lifting mechanism, inclined way, and chute. Fig. 2 is a sectional view of the receptacle, and an end view of the lifting mechanism. Fig. 3 is a horizontal central section of the lifting-wheel, and a top view of the inclined way and chute, with collets at various points thereon. Fig. 4, in two enlarged views, shows the inclined way, in section, and a movable portion of the chute, and illustrates the manner in which two nested collets are discharged back into the receptacle. Figs. 5 and 6 are enlarged sectional views of portions of the lifting-wheel, with collets in proper position to be lifted and delivered to the inclined way, and also in their reversed position and consequently incapable of being lifted. Fig. 7 is an enlarged sectional view of the inclined way with a collet thereon in its proper position. Fig. 8 is an enlarged top view of the inner end of the chute and the inclined way, with the movable portion of the chute partially in section. Fig. 9 is a perspective view of a modification of combined hopper and lifting-wheel.

The hopper or receptacle A, for receiving the collets in mass, may be of any desired form, according to the particular character of lifting mechanism employed therewith; but when arranged to receive an inclined lifting-wheel, B, as shown, it should be tapering at the sides and have a bottom concaved lengthwise, to correspond with the periphery of the lifting-wheel.

The working-face of the lifter-wheel is provided with a series of ledges, a, which present a bearing-surface of such width as will surely allow a collet to roll in its proper position edgewise thereon. These ledges are curved concavely in the plane of the lifter-wheel, for more readily engaging with the collets in lifting them out of a mass and for enabling them to freely roll toward the center of the lifter-wheel as it slowly revolves. The ledges being extremely narrow, I provide for the secure transit of a collet, properly lifted by them, in so inclining the lifter-wheel that the collets, while on the ledges, will find a flatwise leaning support upon the face of the wheel during their rolling motion toward the center of the wheel and also during the operation of lifting them from the mass. The constant rotation of the lifter-wheel has a tendency to so arrange the mass of collets adjacent to the face of the wheel that they will stand at right angles thereto, instead of parallel therewith, as is desired, and I therefore employ a stirrer, b, to keep the mass of collets well mixed up adjacent to the face of the lifter-wheel.

The stirrer shown revolves with the lifter-wheel and has radial arms composed of a strip of sheet metal twisted about half a turn; but the form of the stirrer may be almost indefinitely varied without materially affecting its mixing or proper stirring capacity.

The center of the lifter-wheel on its front face is circularly recessed for the reception of the circular end c of a plate, on which the inclined way C is formed, said way consisting of a ledge formed upon the surface of said plate just wide enough to receive a collet edgewise when presented thereto from the ledges on the lifter-wheel.

It will be readily seen that as the lifter-wheel revolves in the direction indicated by the arrow in Fig. 1, more or less of the collets will be lifted from the mass by the ledges a, as indicated in Fig. 5, and rolled therefrom on their edges to the upper end of the inclined way at c', down which they will continue to roll, as shown, to the lower end of the inclined way adjacent to the entrance of the chute D; and it will be seen that a collet can only rest on the ledges of the lifter-wheel when lying with its convex side outward, as in Fig. 5, because no support is afforded if the convex side of the collet lies next to the face of the wheel, as indicated in Fig. 6. The proper facing of the collets is therefore assured by the lifter-wheel; but if two collets be "nested" one inside the other, they will also be picked up by the lifter-wheel and delivered to the inclined way as if but a single collet, as seen in Fig. 3, and this contingency must be carefully guarded against.

In a contemporaneous application for Letters Patent I have shown and described novel means for automatically feeding front "shells" to button-machines, and said invention includes, as a part thereof, a chute which is complex in its character, in that a portion of one side and a portion of the bottom of the chute are movable to and fro at intervals, from a fixed side of the chute, for dropping such shells as are deposited by the lifting mechanism in such positions as preclude their farther progress into the chute regardless of the facing of the shells one way or the other; and therein I have also provided for the discharge of improperly-faced shells from the chute back to the mass in the hopper.

With the inclined lifter-wheel the proper position of a shell or collet is assured at the outset, and therefore no means are required for discharging either shells or collets when lifted by such a wheel, except when two or more of them have become nested one within another. I have now so constructed and arranged a movable side and bottom of the chute that it arrests and then discharges the nested collets which reach the lower end of the inclined way, and thus prevent them from farther entering the chute.

The chute D is composed of two sections, the upper or entrance portion, $d$, and the lower fixed portion, $e$, which terminates opposite the nippers. (Not shown.) The upper portion of the chute $d$ has an intermittingly-movable front, side, and bottom, they being mounted upon the lower end of a vibrating lever, $d'$, actuated at intervals by any suitable revolving device, and preferably by cam-surfaces in the slot $d^2$ in the rear side of the lifter-wheel, as shown. The lever $d'$ has a spring, which causes its lower end to press toward the chute, except when under the influence of the cam-surfaces $d^3$, of which there are four, (shown in dotted lines in Fig. 1.)

The space between the coincident faces of the fixed and movable sides of the chute, at the entrance thereof, is of such width as will freely allow a single collet to pass, but will check or arrest two or more nested collets, as indicated in Fig. 3, and also in Fig. 4, in the right-hand portion thereof, and such nested collets will be dropped back into the receptacle as soon as the lever $d'$ is vibrated, the movable side and bottom $d$ returning quickly to its normal position, to serve as a bridge between the lower end of the inclined way and the fixed portion of the chute, over which the single collets may readily pass in their downward course. The vibration of the lever $d'$ occurs between the delivery of collets to the inclined way from the ledges on the lifter-wheel, the cam-surfaces $d^3$ being located at points midway of the ledges.

The side of the movable portion $d$ of the chute should be mounted adjustably on lever $d'$, so as to vary the interior width of the chute at its entrance to provide for collets or shells of various sizes.

The nippers used, except to state that their jaws are fitted to grasp a collet circumferentially, need not be herein specifically described, as they are made the subject of a claim in another application for Letters Patent as an essential element in a combination embracing therewith a hopper or receptacle, lifting mechanism, and a chute, which elements, in connection with such nippers, are deemed by me the substantial equivalents of the receptacle, lifting mechanism, and chute herein described. Said nippers are arranged to receive from the lower end of the chute the lowest collet therein, which rolls into the jaws of the nippers and is deposited by them directly into the die of a button-making machine, a segmental plate on the nipper-carrier serving to close the end of the chute during the absence of the nippers therefrom.

In Fig. 9 I show an inclined revolving receptacle or hopper, A′, having its lower head provided on its inner side with curved ledges a′, after the manner of those already described, whereby, as the hopper or receptacle revolves the collets or shells are picked up (from the mass within by the ledges, which with the head constitute a lifter-wheel) and are rolled toward and out of a central opening in the head, which is transversely occupied by the end of a chute or inclined way already described as being formed upon the plate which occupies a central position with relation to the lifter-wheel. Such a construction will serve a good purpose, but I prefer the separate arrangement of hopper and lifting-wheel previously described.

Having thus described my invention, I claim—

1. The combination, substantially as hereinbefore described, with the receptacle, lifting mechanism, and inclined way, of the chute composed of fixed and intermittingly-movable portions, the latter serving as a bridge between the inclined way and the fixed portion of the chute, for the rolling passage of single collets and as a discharger of nested collets, as set forth.

2. The combination, within a receptacle, of the inclined lifter-wheel, provided with ledges, the inclined way, arranged to receive collets rolling on their edges from the ledges on the lifter-wheel, and the chute, having a movable side and bottom at its entrance or upper end, substantially as described.

3. The combination of the inclined way, the fixed portion of the chute, and the intermittingly-vibrated portion, substantially as described.

4. The combination, with a hopper or receptacle, of one or more curved revolving lifting-ledges, substantially as described, whereby said ledges, while revolving in contact with a mass of collets within the hopper, lift the collets, on edge, from the mass and discharge them from the inner ends of said ledges, as set forth.

FRANK P. SHELDON.

Witnesses:
LEMUEL H. FOSTER,
DEXTER B. POTTER.